United States Patent Office 2,970,035
Patented Jan. 31, 1961

2,970,035

SEPARATION OF PLUTONIUM IONS FROM SOLUTION BY ADSORPTION ON ZIRCONIUM PYROPHOSPHATE

Raymond W. Stoughton, Oak Ridge, Tenn., assignor to the United States of America as represented by the United States Atomic Energy Commission No Drawing. Filed Dec. 19, 1944, Ser. No. 568,901

4 Claims. (Cl. 23—14.5)

The invention relates to a process of adsorption in which granular phosphates of zirconium are utilized as adsorbents.

Gelatinous zirconium phosphate, known as zirconium orthophosphate, may be used as an adsorbent and particularly for adsorbing substances of the kind present in neutron irradiated uranium such as plutonium, uranium, and fission products, thereby separating such substances from each other and from foreign products. However, the gelatinous or ortho form of the zirconium phosphate, $ZrO(H_2PO_4)_2$, despite its excellent adsorbing properties, is inconvenient to use because of the comparatively high resistance it offers to the flow of liquids therethrough unless supported on a carrier such as rock wool or other inert material. Also, it is difficult to separate the gelatinous zirconium phosphate from solutions which have contained the adsorbed substances.

It has been discovered that the gelatinous zirconium orthophosphate may be converted to a granular pyrophosphate form having adsorption properties similar to those of the gelatinous form but which is more conveniently used as an adsorbent. The granular zirconium phosphate is particularly suitable for adsorption of substances of the kind present in neutron irradiated uranium, either by column or batch adsorption. Its high specific surface attraction for plutonium makes it extremely useful in processes for separating plutonium from other substances by adsorption. The adsorbent used as herein contemplated may comprise zirconyl pyrophosphate $(ZrO)_2P_2O_7$ or the salt $ZrP_2O_7$.

It is an object of the invention to provide an adsorption process utilizing granular zirconium phosphate. Further objects and advantages will appear from the following description.

The gelatinous zirconium phosphate is prepared by adding phosphoric acid to an aqueous solution of zirconium salt so that zirconium orthophosphate is thrown down as a gelatinous precipitate. The latter is converted to granular zirconium phosphate by dehydration, which may be accomplished by heating the gelatinous form under suitable conditions of time and temperature. After the dehydration has taken place, a zirconium phosphate is obtained as a white, amorphous mass comprising zirconium pyrophosphate which is prepared for use as an adsorbent by pulverizing the mass to the desired particle size.

In preparing zirconium pyrophosphate, any soluble zirconium or zirconyl salt such as a nitrate, chloride, or acetate, is dissolved in water and precipitated with phosphoric acid as insoluble zirconium orthophosphate. An excess of phosphoric acid is used to insure precipitation of all the zirconium. To lessen formation of double salts and prevent the precipitation of impurities which may be present in the zirconium salt, the zirconium solution prior to the precipitation step may be acidified with mineral acids. Acidities of from 1 N to 10 N have been used satisfactorily. Where very pure zirconium orthophosphate is desired, the solution may be acidified with nitric acid to between 4 N and 9 N acidity.

The zirconium orthophosphate precipitate is separated from the solution by filtration, centrifugation, or the like, and the precipitate dehydrated. Substantial dehydration may be effected by heating the precipitate under suitable conditions of time and temperature.

The temperature at which the zirconium orthophosphate is converted to zirconium pyrophosphate is necessarily above 100° C. to substantially dehydrate the zirconium orthophosphate. Preferably, the zirconium phosphate is not heated to its melting point, as this would tend to destroy desirable physical characteristics obtained in converting the gelatinous form. It has been found that the ortho form may be converted to the pyro form by heating the former at a temperature of from 400° C. to 800° C. for fifteen hours, although as will appear more fully hereinafter this heating schedule may be departed from materially without seriously affecting the adsorption efficiency of the resulting adsorbent.

The heat treatment converts the zirconium orthophosphate to a white, amorphous solid containing numerous and minute fissures and irregularities which increase its surface area and aid its adsorptive properties. After cooling, the product is ground to the desired particle size for use as an adsorbent. Particle sizes ranging from 50 to 200 mesh are particularly suitable for many uses, and especially for the adsorption of Pu. The zirconium pyrophosphate obtained by the above method retains its granular form in water and in dilute acid solutions such as 1 M $HNO_3$.

The high adsorption characteristics and granular form of zirconium pyrophosphate make it an excellent adsorbent for many purposes. It is contemplated that its use as an adsorbent will be similar to the uses of such adsorbents as silica gel, zirconium orthophosphate, or similar adsorbents. Zirconium pyrophosphate is especially suitable for adsorbing substances of the kind present in neutron irradiated uranium in view of the specific surface attraction it has for such substances, and particularly for plutonium. Various processes involving these substances may be based on the use of zirconium pyrophosphate as an adsorbent; thus, plutonium, uranium, and fission products may be separated from each other and from foreign products by being adsorbed and subsequently desorbed into substantially separate fractions. The plutonium, when referred to in the following description, is in its reduced or phosphate insoluble state.

The zirconium pyrophosphate may be used in a batch process in which the finely divided adsorbent is placed in a solution containing the substances to be adsorbed and the solution agitated until adsorption is complete, whereupon the adsorbent carrying the adsorbed substances is separated from the solution by filtration, centrifugation, or other suitable means. The adsorbed substances are removed from the adsorbent in any convenient manner such as washing with water, acid solutions, or other desorbing agents. Preferably, the zirconium pyrophosphate is used in column adsorption in which full advantage is taken of the granular nature of the adsorbent. In column adsorption, the granular adsorbent is placed in an elongated container and a solution comprising the substances to be adsorbed is flowed through the container. The adsorbates are removed by flowing wash solutions such as solutions of mineral acids through the container in sufficient quantity to obtain the degree of desorption desired.

In the following description, the isotope of element 93 having a mass of 239 is referred to as $93^{239}$ and the isotope of element 94 having a mass of 239 is referred to as $94^{239}$. Element 94 may also be designated as plutonium, symbol Pu. Reference herein to any of the elements is to be understood as denoting the element generically, whether in its free state or in the form of a compound, unless indicated otherwise by the context.

Neutron irradiated uranium may be prepared by reacting uranium with neutrons from any suitable neutron source, but preferably the neutron irradiated uranium is produced from a chain reaction of neutrons with uranium.

Neutron irradiation of uranium produces $_{92}U^{239}$ which has a half-life of 23 minutes and by beta decay becomes $93^{239}$. This element has a half-life of 2.3 days and by beta decay becomes $94^{239}$. Neutron irradiated uranium contains $93^{239}$, $94^{239}$, and a large number of radioactive fission products produced by reaction of neutrons on fissionable atoms, such as $U^{235}$ which is present in uranium from natural sources. It also contains minor amounts of other products such as $UX_1$ and $UX_2$. Inasmuch as the $93^{239}$ and $94^{239}$ content of neutron irradiated uranium is produced in accordance with the neutron density of exposure times the time of exposure, and as the weight of radioactive fission products is proportional to the amounts of $93^{239}$ and $94^{239}$ formed, it is convenient to separate the desired elements when the combined amounts thereof are minute, such as, for example, approximately .02% by weight of the irradiated uranium. By storing the neutron irradiated uranium for a suitable period of time, the $93^{239}$ is converted almost entirely to $94^{239}$. The fission products are present in the neutron irradiated uranium generally to an extent of about 0.02% by weight. Because the fission products in general are highly radioactive, it is preferred that these materials be removed.

The fission products consist of a large number of elements which may be classified into two groups; a light group with atomic numbers from 35 to 45; and a heavy group with atomic numbers from 51 to 60. The fission products with which I am particularly concerned are those having a half life of more than three days since they remain in the neutron irradiated reaction mass in substantial quantities at least one month after reaction. These products are chiefly radioactive isotopes of Sr, Y, Zr, Cb, and Ru of the group of atomic numbers from 35 to 45; and Te, I, Xe, Cs, Ba, La, and Ce from the group of atomic numbers from 51 to 60, inclusive.

In carrying out an adsorption process using zirconium pyrophosphate to separate substances of the kind present in neutron irradiated uranium, the neutron irradiated uranium, containing minute amounts of plutonium and fission products such as, for example, approximately 0.01% by weight of plutonium and a similar amount of fission products, is dissolved in nitric acid to form a 10% solution of uranyl nitrate hexahydrate, $UO_2(NO_3)_2 \cdot 6H_2O$, the uranyl nitrate hexahydrate containing the dissolved plutonium and fission products. The zirconium pyrophosphate, having a particle size of between 60 to 100 mesh, is placed in the solution and the latter is shaken for sufficient time to permit adsorption of the various substances in the solution, and, particularly, the plutonium. Where 5 grams of the zirconium pyrophosphate are used for each 100 cc. of the uranyl nitrate hexahydrate solution, the solution may be shaken with the adsorbent for between two and three hours. The adsorbent carrying the various adsorbed substances may be removed from the solution by filtration, centrifugation, or other convenient means. The adsorbates are removed from the zirconium pyrophosphate by washing with water or other desorbing agents, such as solutions of mineral acids, that is, $H_2SO_4$, $HNO_3$, and $HCl$, or the like.

In one embodiment of the invention, zirconium phosphate was precipitated from a 9 M HCl solution by an excess of phosphoric acid to form zirconium orthophosphate. The latter was washed with dilute HCl and air dried. It was then heated to 400° C. for four hours to form a white, amorphous solid, considered to be zirconium pyrophosphate. The latter was ground to between 60 and 100 mesh for use as an adsorbent. One gram of the zirconium pyrophosphate was shaken with 20 cc. of a 10% solution of uranyl nitrate hexahydrate for 2½ hours and the adsorbent removed by centrifugation. Analysis of the substances adsorbed indicated that 79% of the plutonium present in the original solution was adsorbed on the zirconium pyrosphosphate and that 25% of the beta emitting fission products present in the original solution were adsorbed. The zirconium pyrophosphate was granular in nature and retained its granular structure during the adsorption process.

Zirconium pyrophosphate prepared as described above was variously treated to determine the effect of such treatments upon the adsorption characteristics of the treated pyrophosphates with respect to untreated pyrophosphate and with respect to silica gel. Thus, zirconium pyrophosphate of between 80 and 100 mesh was prepared as one gram samples and treated as follows: (A) untreated, (B) placed in water for 2½ hours, and (C) placed in a mixture of 0.1 M $H_3PO_4$ and 1 M $HNO_3$ for two hours, washed with very dilute $HNO_3$, and finally washed with water. These samples, together with a one gram sample of silica gel of between 80 and 100 mesh, were each shaken with 20 cc. of a 10% solution of uranyl nitrate hexahydrate for 2½ hours and the particular sample of adsorbent removed by centrifugation. The adsorption characteristics of each sample are given in Table I:

*Table I*

| Adsorbent | Treatment | Percent of $94^{239}$ adsorbed | Percent of fission products |
|---|---|---|---|
| Hyporsil (80–100 mesh) | None | 36 | 6 |
| (A) Zirconium phosphate (80–100 mesh) | None | 79 | 25 |
| (B) Zirconium phosphate (80–100 mesh) | Water | 90 | 21 |
| (C) Zirconium phosphate (80–100 mesh) | $H_3PO_4$–$HNO_3$ washed with water. | 79 | 22 |

As shown in Table I all three samples of zirconium pyrophosphate have a high capacity for adsorption of plutonium when compared with a similar sample of silica gel. The above samples of the pyrophosphate retain their granular structure throughout the adsorption process.

It has been found that the adsorption capacity of the zirconium pyrophosphate is not greatly altered by rather great differences in the temperature at which the zirconium orthophosphate is heated to convert it to the zirconium pyrophosphate. Thus, the zirconium pyrophosphate prepared by heating zirconium orthophosphate (a) at 400° C. for four hours and (b) at 800° C. for fifteen hours does not greatly alter its adsorption characteristics for plutonium.

Three samples of zirconium orthophosphate of ½ gram each were prepared by precipitation from 9 M HCl and air dried. One sample was heated at 400° C. for four hours, the second sample was heated at 800° C. for fifteen hours and the third sample was heated at 800° C. for fifteen hours and pre-soaked in water for four hours before being used as an adsorbent. These samples were then shaken for two hours with 100 cc. portions of a 10% solution of uranyl nitrate hexahydrate. The results obtained for adsorption and desorption for plutonium and for beta emitting fission products by these samples are given in Table II in which all percentages given are percentages of material present in the original 10% uranyl nitrate hexahydrate solution.

Table II

| Preparation of zirconium phosphate | Adsorption | | Elution with 5 cc. 6 M HNO₃ | | Subsequent elution with 5 cc. 8 M HNO₃ | |
|---|---|---|---|---|---|---|
| | Percent Pu | Percent f.p. | Percent Pu | Percent f.p. | Percent Pu | Percent f.p. |
| Heated to 400° C. for 4 hr | 87 | 19 | 31 | 14 | 15 | 4 |
| Heated to 800° C. for 15 hr | 83 | 12 | 56 | 8 | 12 | 2 |
| Heated to 800° C. for 15 hr. and pre-soaked in water for 4 hr | 78 | 16 | 46 | 8 | 12 | 2 |

The rate of adsorption of plutonium by zirconium pyrophosphate is retarded somewhat by the presence of uranyl ions. Zirconium orthophosphate was prepared by being precipitated from 9 M HCl solution, washed with diluted HCl, and air dried. It was then heated at 600° C. for five hours to convert it to zirconium pyrophosphate. The latter was pulverized to between 60 and 100 mesh and pre-soaked in water for eighteen hours. This was then used to test the rate of adsorption of $Pu^{238}$ from a 10% solution of uranyl nitrate hexahydrate in which 0.3 gram of the zirconium pyrophosphate were shaken with 10 cc. of the solution containing $Pu^{238}$. Results are given in Table III, and these are to be compared with a nearly 100% complete adsorption of $Pu^{238}$ in one minute from the solution containing no uranyl ions.

Table III

| Time for Adsorption (minutes) | Percent of $Pu^{238}$ Adsorbed in Presence of $UO_2^{++}$ |
|---|---|
| 12 | 37 |
| 32 | 54 |
| 128 | 73 |
| 18.5 hr | 88 |

It has been found that the completeness of adsorption of plutonium by zirconium pyrophosphate is somewhat lowered by the presence of the uranyl ion in the solution. Also, the equilibrium value for the plutonium desorbed by nitric acid or other mineral acid wash solutions is lower when the adsorption has taken place in the absence of uranyl ion than when uranium is present. Under the same conditions that a 40 to 50% adsorption of plutonium is obtained in thirty minutes in the presence of uranyl nitrate, the adsorption is nearly 100% complete in one minute in the absence of uranyl ion at a pH of from 2 to 0.

In the absence of uranyl ion in the original solution, however, the elution of the plutonium is more difficult. Zirconium pyrophosphate prepared by heating zirconium orthophosphate at 600° C. for five hours was pulverized to between 60 and 100 mesh. 0.3 gram of the zirconium pyrophosphate was shaken for two hours with 100 cc. of a nitric acid solution of plutonium 238 which had a pH of 2.4 and with no uranyl ion present. 100% of the $Pu^{238}$ was adsorbed by the zirconium pyrophosphate. To ascertain various conditions of desorbing or elution, the 0.3 gram of the zirconium pyrophosphate carrying the adsorbed $Pu^{238}$ was agitated with 10 cc. of the various eluant solutions. The results of this test are given in Table IV. A constant shaking on a rotor in the 25° C. experiments and frequent stirring in the 93° C. test was helpful. A certain amount of disintegration of the adsorbent occurred in these tests, especially in the solutions where 3 M $H_3PO_4$ was used.

Table IV

| Eluant used | Temperature of elution (° C.) | Percent $94^{238}$ eluted |
|---|---|---|
| 6 M HNO₃ | 93 | 19 |
| 6 M HNO₃—1 mgm. $Zr^{+4}$ | 93 | 19 |
| 8 M HNO₃ | 93 | 24 |
| 3 M HNO₃—3 M $H_3PO_4$ | 93 | 53 |
| 3 M $H_3PO_4$ | 25 | 25 |
| 1 M $H_3PO_4$ | 25 | 3 |
| 1 M $H_3PO_4$—6 M HNO₃ | 25 | 18 |
| 3 M $H_3PO_4$—3 M HNO₃ | 25 | 40 |

The description thus far has been concerned with a batch adsorption process using zirconium pyrophosphate, for purposes of illustration. However, it is contemplated that the zirconium pyrophosphate may be even more effectively used in a column adsorption process because of the advantages obtained from its granular structure as well as its adsorption characteristics in general. In column adsorption, the zirconium pyrophosphate of between 50 and 200 mesh or other suitable particle size is placed in a container, such as a cylindrical column, and the solution containing the substances to be adsorbed is flowed through the column at a sufficiently slow rate to permit the adsorption of the particular substances desired. The quantity and kind of substances adsorbed may be controlled to some degree by the rate of passage of the solution through the column or by the particle size of the adsorbent. After the adsorption is complete, the various adsorbates may be removed by flowing desorbing agents such as mineral acid solutions through the column.

Where two or more substances are adsorbed by a process of column absorption, there is generally a tendency for such adsorbates to be positioned in the column according to their respective adsorption affinities for the adsorbent. Thus, where plutonium, fission products, and uranium are adsorbed by passing a solution containing them downwardly through a column of zirconium pyrophosphate, a layer effect will result with the plutonium (which has the greatest adsorption affinity for the particular adsorbent) being adsorbed in the upper portion of the column, the fission products below the plutonium, and the uranium below the fission products. While such layers will usually be well defined, in certain instances there may be some overlapping depending upon various conditions of the process, such as the flow rate of the solution, the size and shape of the container, and the amount of adsorbent used.

The above process is known as chromatographic adsorption, and is useful in separating adsorbed substances from each other and from foreign products inasmuch as the process permits desorption of the adsorbates according to their respective adsorption affinities, that is, the adsorbate having the lowest adsorption affinity is removed by the wash solution from the column first, the adsorbate having the next lowest adsorption affinity is removed secondly, and so on. As each adsorbate is removed, it may be collected as a substantially separate fraction. Mineral acid solutions of various compositions and strengths can be used to desorb one or more of the adsorbates.

In view of the specific adsorption characteristics of the zirconium pyrophosphate for plutonium, it is particularly effective in separating plutonium from other substances such as those present in neutron irradiated uranium. Where a solution of neutron irradiated uranium is flowed through a column containing zirconium pyrophosphate, the plutonium is usually adsorbed to a greater extent than are the other substances present. The selective adsorption of plutonium is aided by increasing the rate of flow of the solution containing the plutonium through the column. After the solution has flowed through the column, the plutonium may be removed from the adsorbent with desorbing agents in the manner indicated above and then collected as a substantially separate fraction.

The above detailed description is given for purposes of illustration and the invention is to be limited only by the scope of the following claims.

What is claimed is:

1. A method of separating plutonium from other substances present in a solution containing ions of a compound of plutonium in which the plutonium is in its reduced, phosphate-insoluble state and ions of other substances which comprises contacting the solution with granular zirconium pyrophosphate whereby said plutonium ions are adsorbed leaving the ions of the other substances in solution.

2. A method of separating plutonium from other substances in a solution containing ions of a compound of plutonium in which the plutonium is in its reduced, phosphate-insoluble state which comprises adsorbing said plutonium and other substances on granular zirconium pyrophosphate, and desorbing said other substances while said plutonium having a valent state of not greater than +4 remains adsorbed.

3. The process of obtaining plutonium in a more concentrated state from neutron irradiated uranium containing ions of a compound of plutonium in which the plutonium ions are in its reduced, phosphate insoluble state and ions of compounds of uranium and fission products which comprises forming a solution containing ions of elements present in neutron irradiated uranium, contacting said solution with granular zirconium pyrophosphate whereby said plutonium ions are adsorbed from solution leaving ions of compounds of said fission products and uranium in solution, and then removing the adsorbed plutonium and the zirconium phosphate from solution.

4. The process of separating plutonium from an aqueous solution containing ions of a compound of plutonium in which the plutonium ions are in its reduced, phosphate-insoluble state, the step of contacting said solution with granular zirconium pyrophosphate whereby said plutonium ions are adsorbed from the aqueous solution, and then separating the adsorbed plutonium and zirconium phosphate from the remaining solution.

References Cited in the file of this patent

UNITED STATES PATENTS

| | | |
|---|---|---|
| 1,059,531 | Ebler | Apr. 22, 1913 |
| 1,976,875 | Connolly et al. | Oct. 16, 1934 |
| 2,038,078 | Hardiek | Apr. 21, 1936 |
| 2,336,793 | Layng | Dec. 14, 1943 |
| 2,349,243 | Bates | May 23, 1944 |
| 2,367,877 | Layng | Jan. 23, 1945 |
| 2,799,553 | Thompson et al. | July 16, 1957 |
| 2,859,093 | Russell et al. | Nov. 4, 1958 |

OTHER REFERENCES

Mellor: Inorganic Chem. vol. 7 (pages 163 and 164), Longmans, Green & Co. (N.Y.), 1927. Copy in Division 59.